United States Patent Office 3,177,658
Patented Apr. 13, 1965

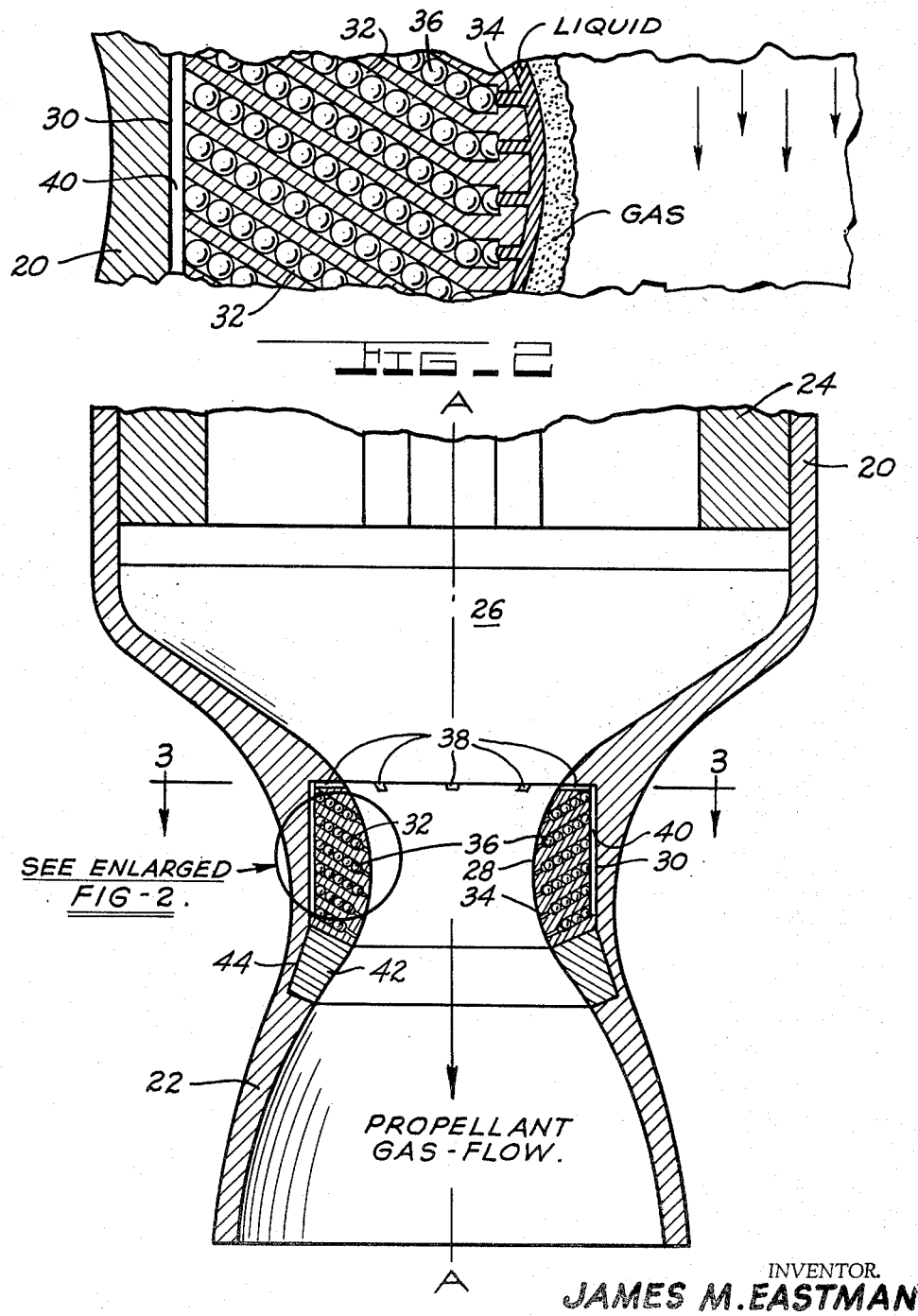

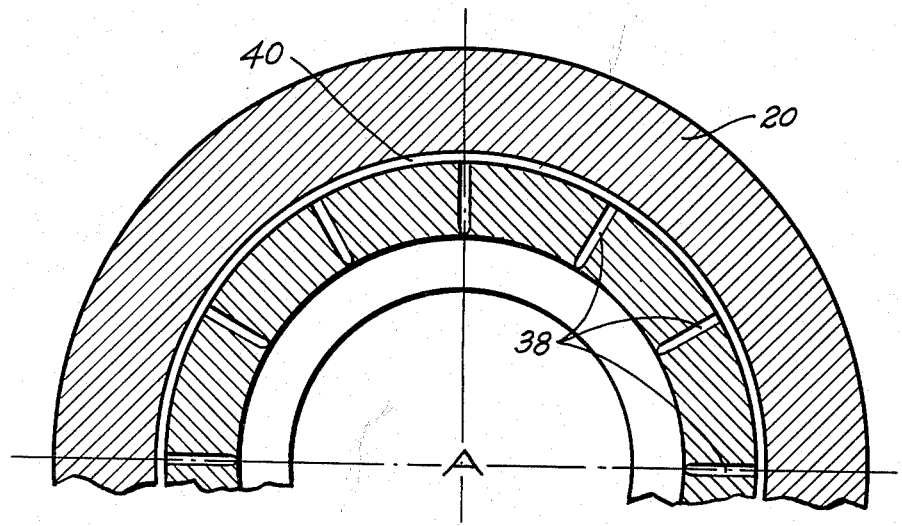
FIG_3

3,177,658
COOLING APPARATUS FOR A ROCKET ENGINE
James M. Eastman, South Bend, Ind., assignor to The Bendix Corporation, South Bend, Ind., a corporation of Delaware
Filed June 10, 1963, Ser. No. 286,660
4 Claims. (Cl. 60—35.6)

This invention relates to rocket engines and, in particular, relates to a rocket engine having a converging/diverging thrust nozzle communicating with a combustion chamber from which the high temperature, high pressure products of combustion of a solid propellant are expelled through the thrust nozzle at high velocity to the atmosphere.

It is well known that the efficiency of a rocket engine increases as a function of higher burning temperatures of the propellant which is expelled through the rocket nozzle to produce thrust. Present day materials from which rocket casings and/or rocket nozzles are fabricated are not capable of withstanding the high temperature, corrosive, and erosive products of combustion of existent propellants for more than relatively short periods of powered flight without excessive deterioration and subsequent structural failure thereof.

Various methods have been proposed for cooling the walls of the rocket engine combustion chamber and/or thrust nozzle to thereby protect the same against the severe temperature and corrosive and erosive conditions experienced with the products of combustion of rocket propellants in use at the present time and contemplated for the future. The proposed methods have not been entirely satisfactory due to weight penalties imposed by the cooling structure and/or cooling mechanism, nozzle throat dimension changes resulting from the use of ablating materials therein, reliability or the like.

Also, proposed methods which operate on a principle of film or sweat cooling as in the case of the present invention have provided a liquid such as water, alcohol or the like as the cooling medium which liquids, by virtue of relatively low boiling temperature, result in cooling of the chamber or nozzle walls to a greater degree than is actually required. Assuming the chamber or nozzle wall to be maintained at the boiling temperature of the liquid which vaporizes at the surface thereof, it will be recognized that the temperature capabilities are not fully utilized. The refractory material used for rocket combustion chamber and/or nozzle linings is normally capable of withstanding temperatures well in excess of the boiling temperatures of the liquids without deterioration. Thus the maximum continuous temperature which the lining can tolerate is not approached. Furthermore, for a given temperature of the gas flowing through the rocket nozzle, for instance, the heat transfer rate across the gas film derived from the cooling medium increases as a function of the temperature differential thereacross. The temperature differential between the boiling liquid at the lining wall and the gas flow through the nozzle is relatively large which, in turn, establishes a greater heat transfer rate and thus a greater liquid cooling flow rate than would be required, for example, with a cooling medium which boils at a temperature closer to the temperature capability of the lining wall.

It is an object therefore of the present invention to provide cooling apparatus for a wall which utilizes a solid cooling medium having a boiling temperature which closely approaches that of the temperature which the wall material can tolerate thereby taking full advantage of the heat resistant qualities of the wall material and reducing the cooling load imposed on the cooling medium to a minimum.

It is therefore an object of the present invention to provide simple and reliable apparatus for reducing the transfer of heat to a casing from a heated motive gas flowing therethrough.

It is an object of the present invention to provide coolant apparatus for the walls of a rocket thrust nozzle.

It is another object of the present invention to provide simple and reliable apparatus for providing an insulating fluid film between a casing wall and a high temperature gas flowing at high velocity through the casing.

It is still another object of the present invention to provide cooling apparatus of the film or sweat type wherein the cooling medium undergoes a change in state not only from a liquid to a vapor but also from solid to liquid, thereby absorbing a correspondingly larger quantity of heat.

Other objects and advantages of the present invention will become apparent from the following description taken with the accompanying drawings wherein:

FIGURE 1 is a sectional view of the aft end of a rocket engine casing including a thrust nozzle embodying the present invention;

FIGURE 2 is an enlarged sectional view of a portion of FIGURE 1; and

FIGURE 3 is a sectional view taken on line 3—3 of FIGURE 1.

Referring to the drawings, numeral 20 designates a rocket engine casing which terminates in a converging/diverging thrust nozzle 22 through which the hot motive products of combustion of a solid propellant fuel 24 pass from a combustion chamber 26 and expand in the diverging portion thereof to generate propelling thrust. The high pressure, high temperature products of combustion are expelled through the nozzle 22 at high velocity which results in rapid thermal and aerodynamic erosion of the nozzle throat section and subsequent malfunction of the nozzle unless adequate protection is provided for the nozzle wall. To this end, the present invention utilizes an annular member 28 made of a refractory material which is disposed in a complementary recess 30 formed in the wall of casing 20 and which is curved to define the throat portion of nozzle 22. A plurality of passages 32 formed in annular member 28 are arranged in parallel spaced apart relationship and extend radially inwardly and rearwardly from the radially outermost side to the throat portion of annular member 28 as shown in FIGURE 1. The passages 32 are distributed circumferentially throughout the annular member 28 in circumferentially spaced apart relationship and are provided with reduced diameter end portions 34 which openly communicate with the throat of annular member 28. Each passage 32 contains a plurality of spheres of solid coolant material 36 such as beryllium or other suitable material selected on the basis of heat capacity, boiling temperature and weight. The spheres 36 are aligned in abutting relationship in the respective passages 32 with the radially innermost sphere 36 abutting the shoulder formed by the reduced diameter end portion 34 of the pasasge 32.

The forward surface of annular member 28 is provided with a plurality of circumferentially spaced radially extending passages 38, each of which communicate with an associated annular space 40 formed in the radially outermost surface of annular member 28 and openly communicating with the radially outermost ends of passages 32 as shown in FIGURE 2.

The annular member 28 is held in position in recess 30 by an annular retaining member 42 formed of graphite or other suitable heat resistant material and located in a complementary recess 44 in casing 20.

In operation of the rocket engine, combustion of the solid propellant fuel 24 results in pressurization of combustion chamber 26 by virtue of the hot motive products of combustion generated therein. The flow of hot gas through the nozzle throat defined by annular member 28 results in a corresponding temperature rise of the inner wall portion thereof and a transfer of heat radially outwardly toward the spheres 36 immediately adjacent reduced diameter end portions 34 of passages 32. As indicated in FIGURE 2, the beryllium spheres 36 immediately adjacent the end portions 34 absorb heat transferred thereto by the refractory material of annular member 28 and change in state from a solid to a liquid whereupon the liquid beryllium flows through the reduced diameter end portions 34 to the radially innermost wall of annular member 28 to form a liquid layer thereon. The liquid layer of beryllium being immediately adjacent the hot motive gases flowing to the nozzle throat readily absorbs additional heat therefrom and changes in state from a liquid to a gas, which is subsequently carried out of the nozzle throat by the flow of hot motive gas, and in so doing provides an insulating gaseous layer or blanket between the hot motive gases and the liquid beryllium. Once a liquid layer of beryllium is established on the nozzle throat wall, the feed rate, which of course depends on heat transfer to the melting zone at the reduced diameter portion 34, of liquid beryllium is primarily a function of the thermal conductivity of the refractory material of annular member 28 and the liquid beryllium blanketing the innermost wall of annular member 28 as well as the dimensions of the reduced diameter portion 34 of passages 32 and the liquid beryllium filling the same.

Upon generation of sufficient thrust by nozzle 22, the rocket casing 20 is launched and accelerated which, in turn, imposes "g" forces on spheres 36 which move along inclined passages 32 toward the reduced diameter end portions 34 thereof as the spheres 36 immediately adjacent end portions 34 undergo a progressive change in state from a solid to a liquid. The "g" forces acting to urge spheres 36 along passages 32 are augmented by the forces derived from the pressurized gas which flows through passages 38 and annular space 40 from the combustion chamber 26 to the passages 32 where it acts against the radially innermost spheres 36 therein and provides added force holding them against the shoulders adjoining the reduced diameter passages 24. It will be noted that the annular space 40 is dead ended adjacent the last passage 32 communicating therewith, such that the gas flow into passages 38 and annular space 40 is trapped thereby providing a substantially non-flowing volume of pressurized gas which reduces the influx of hot gas from combustion chamber 26 while maintaining the gas in passages 38 and annular space 40 under pressure.

As pointed out heretofore, the material from which spheres 36 is made is selected on the basis of characteristics including boiling temperature, weight and heat capacity. Beryllium has been suggested as a suitable metal by virtue of its relatively light weight, boiling temperature of 5020° F. and melting temperature of 2340° F. and high heat capacity. The relatively high boiling temperature of 5020° F. is within the temperature capabilities of known refractory materials from which the annular member 28 may be made and the corresponding high wall temperatures maintained at the nozzle wall significantly reduces the heat transfer rate to the layer of liquid beryllium at the nozzle wall thereby minimizing the quantity of beryllium required for cooling purposes.

It will be understood that various changes in modifications in the structure shown and described may be made by those persons skilled in the art without departing from the spirit of the present invention. For instance, it may be advantageous to eliminate the reduced diameter end portions 34 in passages 32 and substitute therefor a suitable layer of porous refractory material to define the nozzle wall through which the melted beryllium may migrate to form a liquid blanket at the surface thereof. Also, a plurality of smaller passages may be substituted for the one large passage defined by each of the reduced diameter end portion 34.

It will also be understood that this invention is not limited to rocket engine application, but could be valuable for any application requiring thermal protection of a wall from very high temperatures with minimum coolant weight.

I claim:

1. Cooling apparatus for use for with a rocket engine having a combustion chamber openly communicating with a thrust nozzle, said cooling apparatus comprising:
   an annular lining member operatively connected to the thrust nozzle and defining the throat portion thereof,
   a plurality of circumferentially spaced apart passages formed in said annular member and extending radially outwardly from the throat portion thereof,
   a reduced diameter end portion formed at the radially inner end of each of said passages,
   a plurality of separate portions of solid coolant material aligned in each of said spaced apart passages and adapted to move therethrough in succession to a position abutting said reduced diameter end portion thereof,
   said portions of coolant material undergoing a change in state at said reduced diameter portions from a solid to a liquid and flowing therethrough to form a liquid layer of coolant material on said throat portion which, in turn, is vaporized to thereby maintain the wall of said throat portion at a temperature substantially lower than the temperature of the gas flow therethrough.

2. Cooling apparatus for use with a rocket engine as claimed in claim 1 wherein said plurality of circumferentially spaced apart passages extend radially outwardly from the throat portion of said annular lining member and angularly relative to the longitudinal axis of said annular member such that said portions are urged toward said reduced diameter end portion in response to an acceleration of said rocket engine.

3. Cooling apparatus for use with a rocket engine as claimed in claim 1 wherein the radially outermost end of each of said circumferentially spaced apart passages is communicated with the combustion chamber from which pressurized products of combustion flow to said outermost ends where it acts against the radially outermost portions of coolant material to thereby generate a force which tends to urge said portions toward said reduced diameter end portions.

4. Cooling apparatus for use with a rocket engine as claimed in claim 1 wherein said portions of solid coolant material are substantially spherical and formed of a metal such as beryllium having a relatively high melting temperature and great heat capacity.

No references cited.

SAMUEL LEVINE, *Primary Examiner.*